United States Patent [19]

Leverault et al.

[11] Patent Number: 5,051,868
[45] Date of Patent: Sep. 24, 1991

[54] COMPUTER CONSTRUCTION

[75] Inventors: Craig M. Leverault, Mountain View; Peter C. D. Ta, Newark, bothof, Calif.

[73] Assignee: Sun Microsystems, Inc., Mountain View, Calif.

[21] Appl. No.: 558,078

[22] Filed: Jul. 25, 1990

[51] Int. Cl.⁵ .......................... H05K 5/00; G06F 1/00
[52] U.S. Cl. .................................. 361/395; 361/394; 361/399; 364/708
[58] Field of Search ............... 364/708; 312/223, 244, 312/293, 325; 206/305, 569; 73/431; 361/331, 380, 391, 394, 395, 399, 415

[56] References Cited

U.S. PATENT DOCUMENTS

| | | | |
|---|---|---|---|
| 2,127,605 | 8/1938 | Kucher et al. | 206/305 |
| 4,652,969 | 3/1987 | Stegeng | 361/399 |
| 4,736,332 | 4/1988 | Crease | 364/708 |
| 4,901,205 | 2/1990 | Landis et al. | 361/399 |

Primary Examiner—Leo P. Picard
Assistant Examiner—Michael W. Phillips
Attorney, Agent, or Firm—Blakely Sokoloff Taylor & Zafman

[57] ABSTRACT

A computer construction particularly suited for desktop computers whereby the computer may be opened to provide access to substantially all of the functional components thereof for trouble shooting, maintenance and repair purposes without disconnection of any of the interconnects within the computer and without any interference with the connectability thereof with the outside world, whereby the computer and the input-/output functions thereof may be fully functional and exercisable when the computer is so opneed. The computer housing is split into upper and lower housing assemblies with the mother board fastened into the lower portion of the lower housing assembly and the power supply, cooling fan and disk drives fastened into the upper housing assembly. The power supply is positioned adjacent one end of the respective housing assembly and extends out of the open face thereof, with the opposite end of the upper housing assembly and the adjacent end of the lower housing assembly having interfitting means for coupling the same together when the two housing assemblies are fitted together, thereby closing the computer housing. When so closed, the power supply spans between the upper and lower housing assembly, with the two being fastened together by way of a lock extending into the power supply case. Various other aspects of the invention, including the use of the power supply case as both a structural and alignment apparatus are disclosed.

24 Claims, 7 Drawing Sheets

COMPUTER CONSTRUCTION

BACKGROUND OF THE INVENTION

1. Field of the Invention.

The present invention relates to the field of computer construction, and more particularly desktop computer construction.

2. Prior Art.

Desktop computers are generally characterized by the fact that the same are complete computer systems of a size suitable for disposition on a desk, including interfaces for communicating with printers and similar devices, similar computer systems, central computer systems, file servers and the like. Previously many such systems tended to be self contained with central processing unit, random access memory, disk storage, keyboard and display. At the present time, most desktop computers utilize a detached keyboard (for applications requiring a keyboard) and many, particularly the higher performance computers, utilize a detached display, thereby allowing a choice of display best suited for the particular application, and/or no use of a display in applications which do not require a dedicated display. Accordingly, computers of this type comprise a "box" containing a power supply, a mother board or CPU board, possibly one or more add-in boards, a power supply, one or more disk drives such as, by way of example a hard disk drive and a floppy disk drive, and all I/O (input-output) connections for connection to a source of power, a keyboard, a display, peripheral devices, computer networks and the like.

From time to time it may be necessary to open a computer such as a desktop computer for various purposes, including the addition of more memory or an add-in board, the change of other components such as a disk drive or for trouble shooting and repair purposes. Whatever the reason for opening the computer, it would be preferable if once open, the major components of the assembly would be readily accessible without requiring the removal of one to get at some other component for testing or replacement purposes. In many prior art computers access is provided by the removal of a panel thereof to expose the major components of the computer as supported on the computer base structure. In such organizations, typically access to various components is very restricted without further disassembly of the computer. Further disassembly, however, frequently requires disconnection of various components, making it difficult or impossible to operate the computer for trouble shooting purposes when so disassembled.

While it is desirable to be able to easily gain access to the inside of the computer in certain situations, it is also desirable to provide a simple means of preventing access thereto by unauthorized persons. For this purpose some prior art computers, particularly large computers, are provided with key actuated locks which will retain the box closed until opened by a key in the possession of authorized personnel. At the present time, the power and usefulness of desktop computers is steadily increasing while the size of many of the same is in turn decreasing, making such computers susceptible to theft by removing the same in boxes or briefcases of nonsuspicious size. Accordingly, in some situations it may be desirable to provide some means for locking a computer in place so that the same cannot be simply slipped into a box or briefcase by authorized personnel without requiring some form of destructive and attention getting effort to do so.

BRIEF SUMMARY OF THE INVENTION

A computer construction particularly suited for desktop computers whereby the computer may be opened to provide access to substantially all of the functional components thereof for trouble shooting, maintenance and repair purposes without disconnection of any of the interconnects within the computer and without any interference with the connectability thereof with the outside world, whereby the computer and the input/output functions thereof may be fully functional and exercisable when the computer is so opened. The computer housing is split into upper and lower housing assemblies with the mother board fastened into the lower portion of the lower housing assembly and the power supply, cooling fan and disk drives fastened into the upper housing assembly. The power supply is positioned adjacent one end of the respective housing assembly and extends out of the open face thereof, with the opposite end of the upper housing assembly and the adjacent end of the lower housing assembly having interfitting means for coupling the same together when the two housing assemblies are fitted together, thereby closing the computer housing. When so closed, the power supply spans between the upper and lower housing assembly, with the two being fastened together by way of a lock extending into the power supply case. Various other aspects of the invention, including the use of the power supply case as both a structural and alignment apparatus are disclosed.

DETAILED DESCRIPTION OF THE INVENTION

Figures 1, 2:
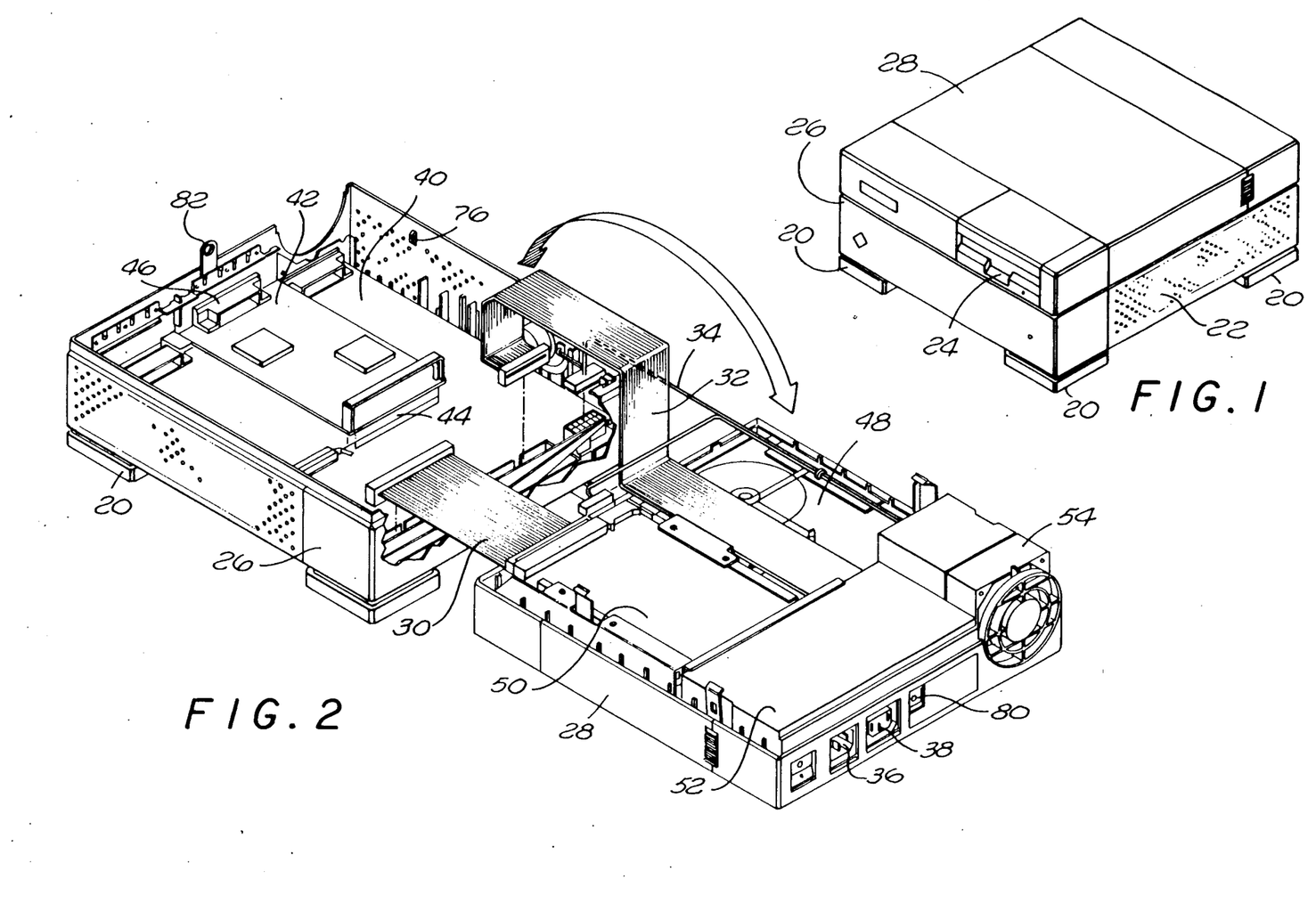
FIG. 1 a perspective view of a typical computer in accordance with the preferred embodiment of the present invention.
FIG. 2 is a perspective view of the computer of FIG. 1 with the upper and lower housing assemblies thereof being separated and layed side to side.

First referring to FIG. 1, a perspective view of the computer construction of the present invention may be seen. The computer of this embodiment, as shown therein, is comprised of a boxlike structure having an approximately square horizontal planform and a height of only a fraction of the length and width thereof, the boxlike structure being mounted on feet 20 for elevating the same somewhat above a table or desktop on which it will typically rest. The structure shown in the figure, aside from its basic shape, is characterized by a perforated side structure 22 on each side of the lower portion thereof for allowing the passage of air therethrough for cooling purposes, and a floppy disk drive access 24 on the front thereof for insertion and removal of floppy disks. The computer housing or enclosure is comprised of two major assemblies, namely a lower housing assembly 26 to which feet 20 attach, and an upper housing assembly 28 in essence forming a cover thereover, the upper and lower housing assemblies being joined at the open faces thereof in a manner to be subsequently described to enclose the various components of the computer system housed therein. In the embodiment shown in the figure, all electrical connections for power, I/O interfaces, etc. are provided at the back of the computer and are not visible in the figure.

When the upper and lower housing assemblies are mechanically decoupled from each other, the upper housing assembly 28 may be rotated in much the same manner as if hinges were provided at the front of the computer between the upper and lower housing assemblies so that the upper housing assembly 28 may lie open face up on the supporting surface adjacent the open face up lower housing assembly 26. As may be seen in the figure, the various components making up the computer system are distributed between the lower housing assembly 26 and the upper housing assembly 28, the same being fully interconnected electrically such as by flexible cables 30, 32 and 34. These connections, normally folded within the enclosure, maintain all the electrical connections between the two housing assemblies so that the mere opening of the computer enclosure does not in any way interfere with the operation of the computer for trouble shooting purposes. In that regard, as shall subsequently be seen in greater detail, the various electrical connections to and from the outside world through appropriate connectors accessible at the back of the computer enclosure are distributed on both the upper and lower housing assemblies, the power connection 36 (115 to 230 volts, 50 or 60 Hz) as well as an auxiliary power connection 38 being provided in the upper housing assembly as is visible in FIG. 2.

Since the opening of the computer enclosure in the manner shown in FIG. 2 in no way obstructs any of the connections to the outside world, the computer may be operated in the open condition shown in the figure with all connections to the outside world including peripheral connections, network connections, and the like being fully operative so that all functions of the computer may be exercised as desired. Also as may be seen in the figure, when the computer is opened as shown, the major components of the computer basically lie side by side so as to be accessible as opposed to being stacked one upon another so as not to be accessible without further disassembly thereof. In particular, the mother board or CPU board 40 is disposed in the lower housing assembly 26 with one or more I/O cards 42 making connection between a connector such as connector 44 on the CPU board and a connector such as connector 46 on the I/O board accessible through the rear of the lower housing assembly. In the upper housing assembly, in the embodiment shown, a floppy disk drive 48 and a hard disk drive 50 are disposed side by side adjacent the end of the upper housing assembly constituting the front of the computer enclosure (see FIG. 1), with a unit comprising a power supply 52 and cooling fan 54 being disposed adjacent the floppy drive and the hard drive at the rear of the upper housing assembly.

Figure 3:
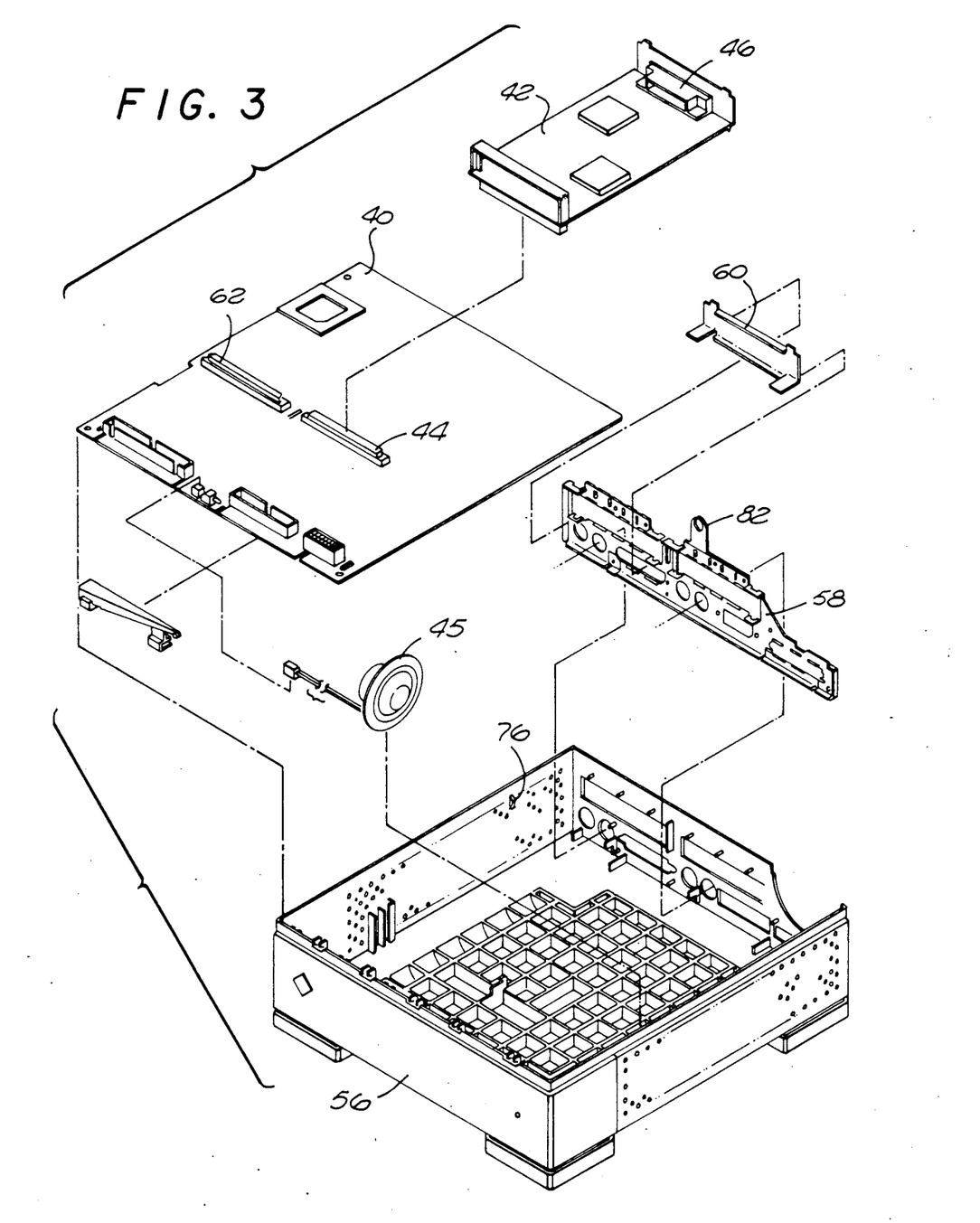
FIG. 3 is a perspective exploded view of the major components of lower housing assembly.

Now referring to FIG. 3, the basic elements making up the lower housing assembly may be seen. A plastic molded lower housing member 56 receives an I/O plate assembly 58 comprising a pair of metal plates adjacent the rear of the housing member and the CPU board 40 adjacent the bottom thereof. A speaker 45, connected to the CPU board 40 through an appropriate connector, slides between a pair of channels molded into the side of the lower housing member 56 to retain the same in position when the two housing members are coupled together as shown in FIG. 1. An I/O board 42 mates with connector 44 providing connection to the outside world through connector 46 supported by I/O plate assembly 58. In the specific embodiment disclosed, a second I/O connector opening in the I/O plate assembly 58 is plugged by plate 60 but obviously in other embodiments, another I/O board might be used to connect to connector 62 on the CPU board to provide a second I/O port if desired.

Figure 4:
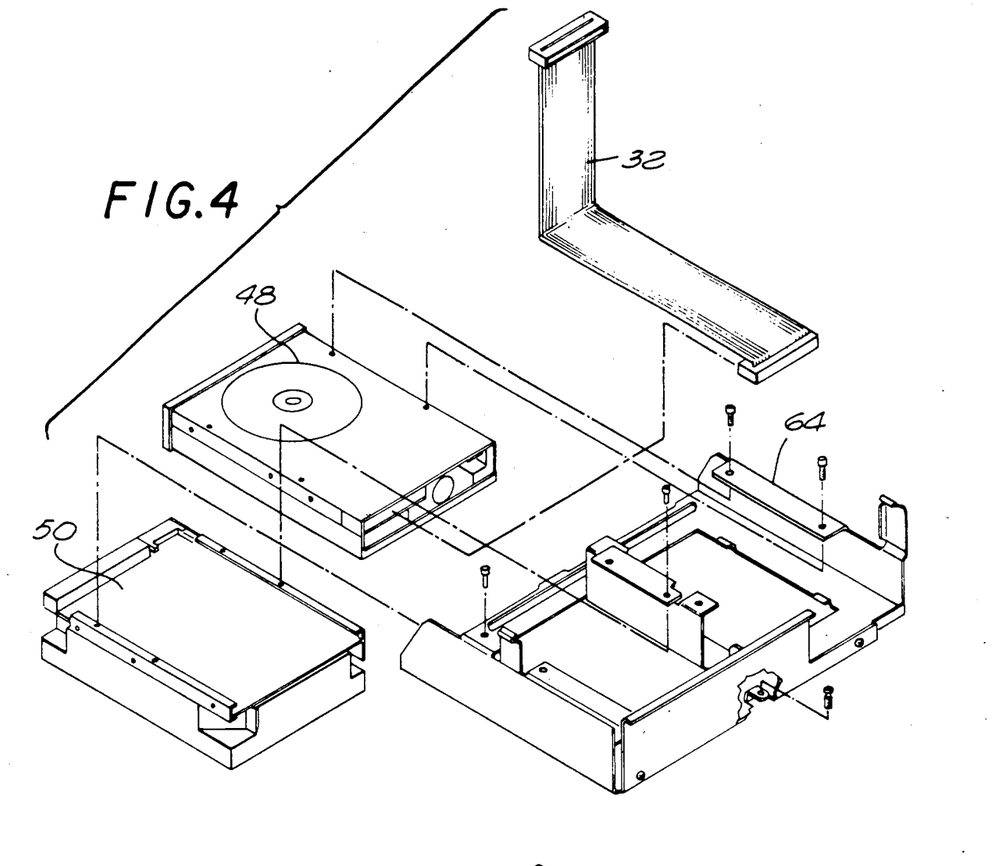
FIG. 4 is an exploded perspective view of the disk drive and supporting frame therefor.
Figure 5:
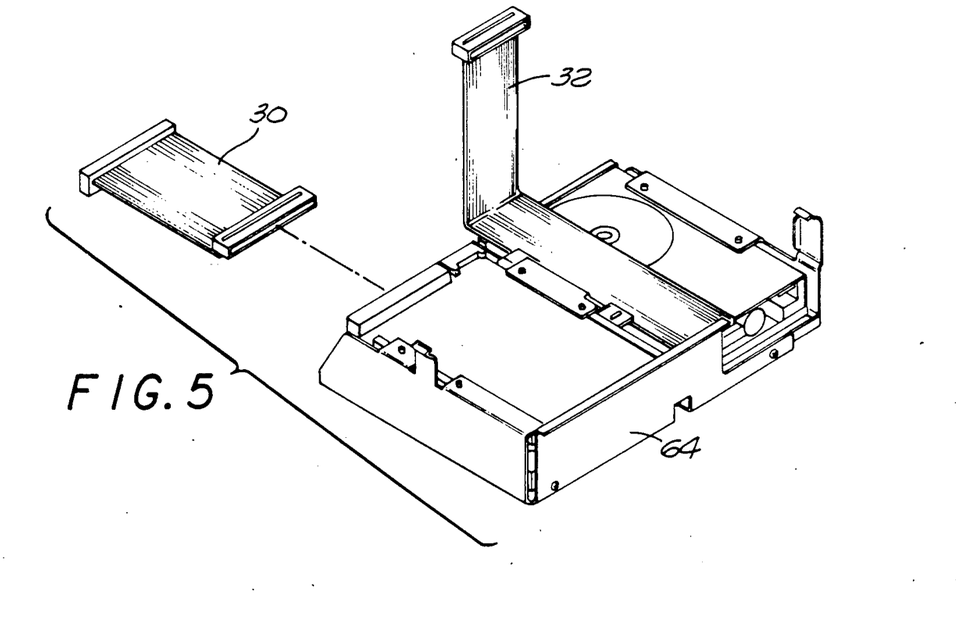
FIG. 5 is a perspective view of the assembly of the disk drive frame and cabling therefor.

Now referring to FIGS. 4 and 5, a subassembly forming part of the upper housing assembly may be seen. This assembly in the preferred embodiment is comprised of a floppy disk drive 48 and a hard disk drive 50 (see also FIG. 2) which mounts in a sheet metal frame 64 so that both drives are rigidly supported by the frame so as to provide access for interconnect cables 30 and 32 therefor and of course for providing appropriate clearance for the floppy disk drive access.

The frame 64 holding the disk drive as well as an assembly comprising power supply 52 and fan 54 both mount in the upper housing member 28. As may be seen in FIG. 2, the frame 64 holding the disk drives spans essentially the full width of the upper housing member 28, as does the power supply and fan assembly, so that the structure of these assemblies provides support for the upper surface of the assembled computer housing providing both increased rigidity and support for that portion of the injection molded upper housing. Also it will be noted that the power supply 52 and fan assembly 54 each have grooves 66 therein which grooves capture and retain spring clips or latches 68 when the power supply and fan assembly is fastened into the upper housing member 57 (see FIG. 6). The spring clips or latches 68 may be seen in more detail in the view of this assembly shown in FIG. 7, an exploded view looking up under a portion of the upper housing assembly. As shown therein, the spring clips 68 are each retained in position in part by members 70 which extend between the power supply and fan assembly and the upper housing member 57, with a plastic finger grip member 72 extending through appropriately disposed openings in the upper housing 28. Clips 68, as may be best seen in FIG. 7, extend below (beyond the open face of) the upper housing assembly, and each have an opening therethrough, the function of which shall be subsequently described.

When the upper and lower housing assemblies are completed the interconnect cables 30 and 32 and any auxiliary power lines such as power line 34 are interconnected between the two assemblies. In this stage of the assembly, all external connections may be made to the housing assemblies so that the computer can be turned on and any and all functions thereof exercised to be sure that the various components are working, that the various devices are properly interconnected, and of course for troubleshooting if in fact the system is not completely functional for some reason.

Figure 7:
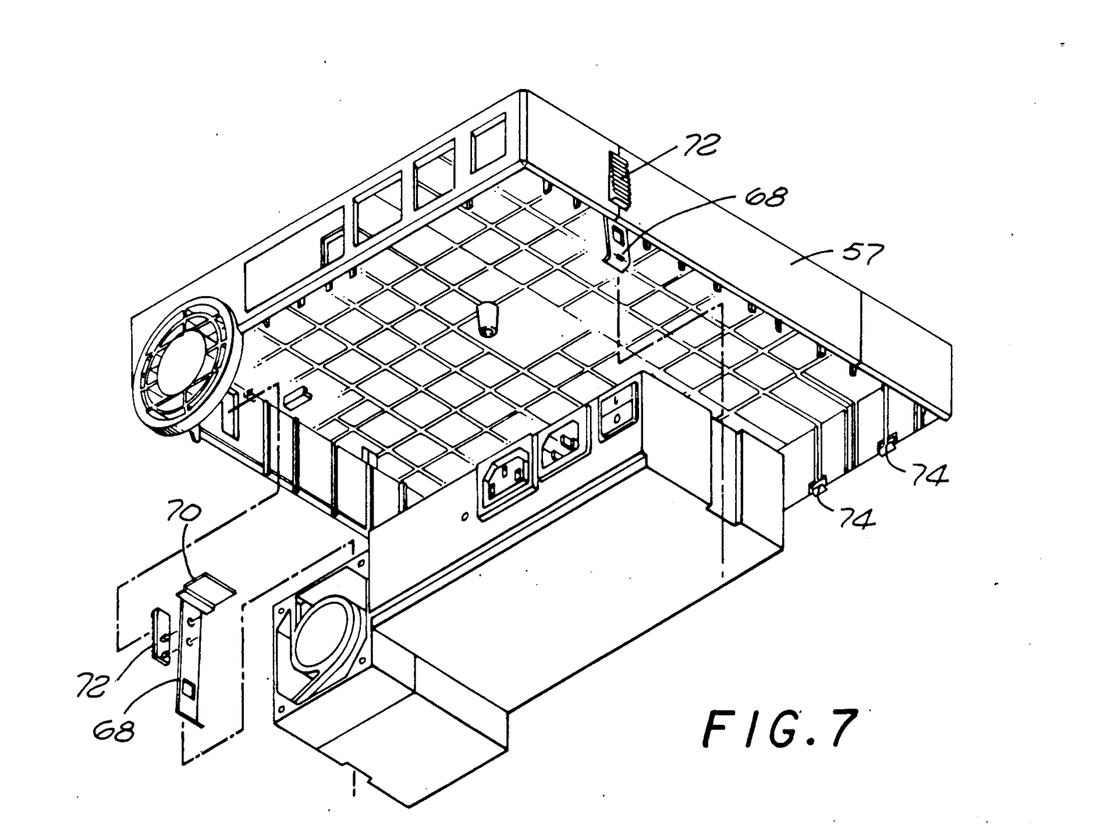
FIG. 7 an exploded perspective view of part of the upper housing as viewed looking upward thereinto.
Figure 8:
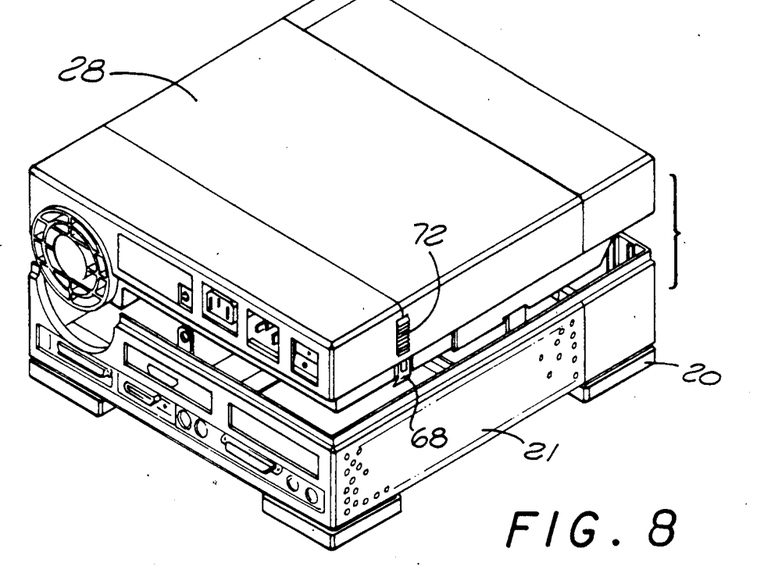
FIG. 8 is a rear perspective view of the upper and lower housing assemblies during the assembly of the two together.

For final assembly, the upper housing assembly may be lifted and rotated as shown in the FIG. 8 so that the same is held over the lower housing assembly as shown in the figure. Then small hooks 74 (see FIG. 6 and particularly FIG. 7) along the lower edge of the portion of the upper housing member 57 at the front of the computer assembly may be hooked under cooperatively disposed projections on the lower housing member 56, and the upper housing assembly then rotated down into its final cooperative disposition on the lower housing assembly to complete the computer enclosure. When so rotated, spring clips 68 (FIG. 7) will snap over and then engage projections 76 (see FIGS. 2 and 3) on the lower housing member, which together with the interfitting of the adjacent faces of the two housing members retains the assembly together. In that regard, note that the power supply 52 and the fan 54 as mounted in the upper housing assembly 28 both extend beyond the open face of the upper housing member as shown in FIG. 2, and thus in the final assembly of FIG. 1 extend down into the lower housing assembly so as to provide a positive lateral reference between the two housing assemblies. Further, the fan and power supply also receive vertical support from the lower housing assembly 26, as does the frame 64 for the two disk drives, so that the frame encasing these components of the computer system also serves in part as structure for the overall assembly.

Figure 6:
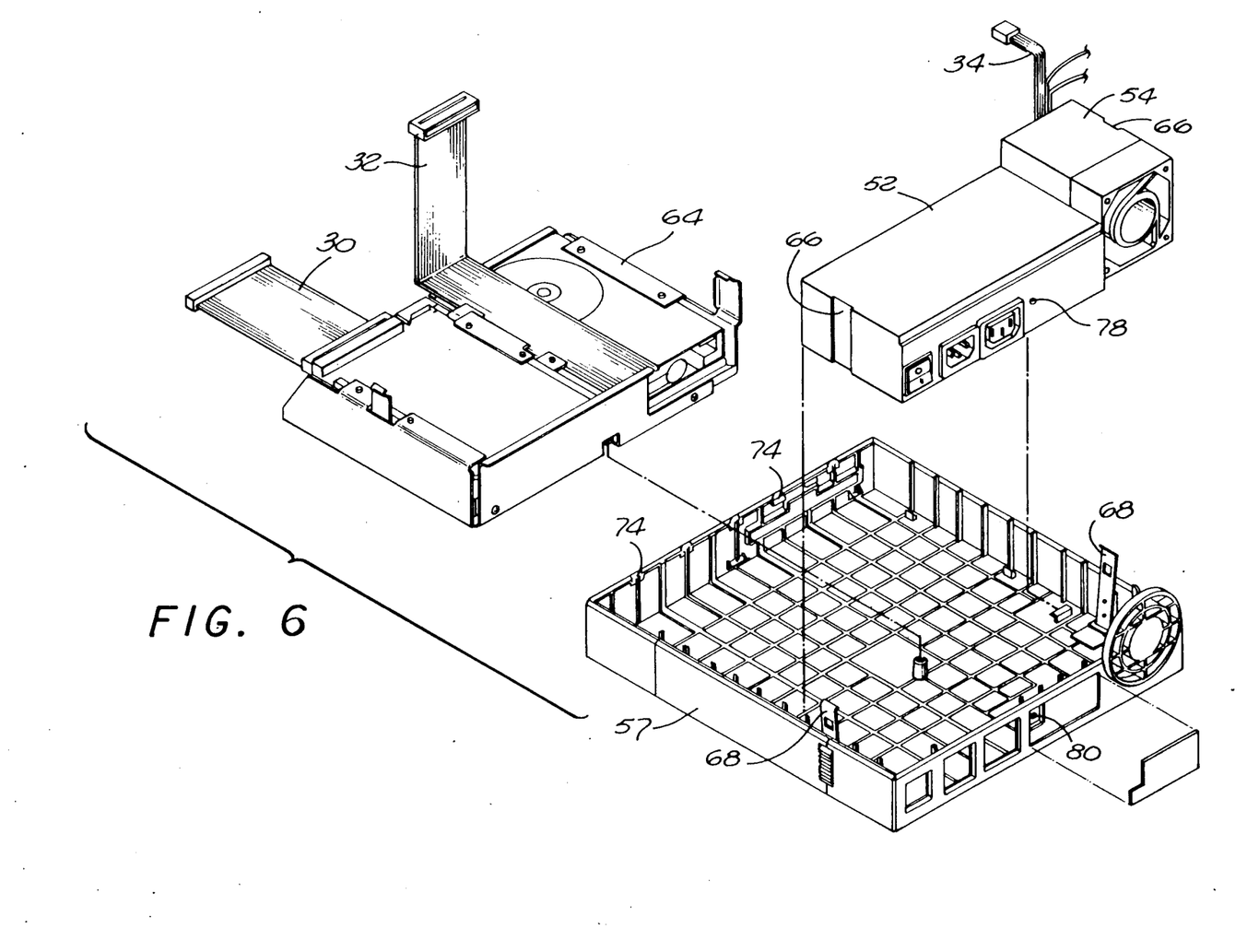
FIG. 6 is an exploded perspective view of the upper housing assembly.
Figure 9:
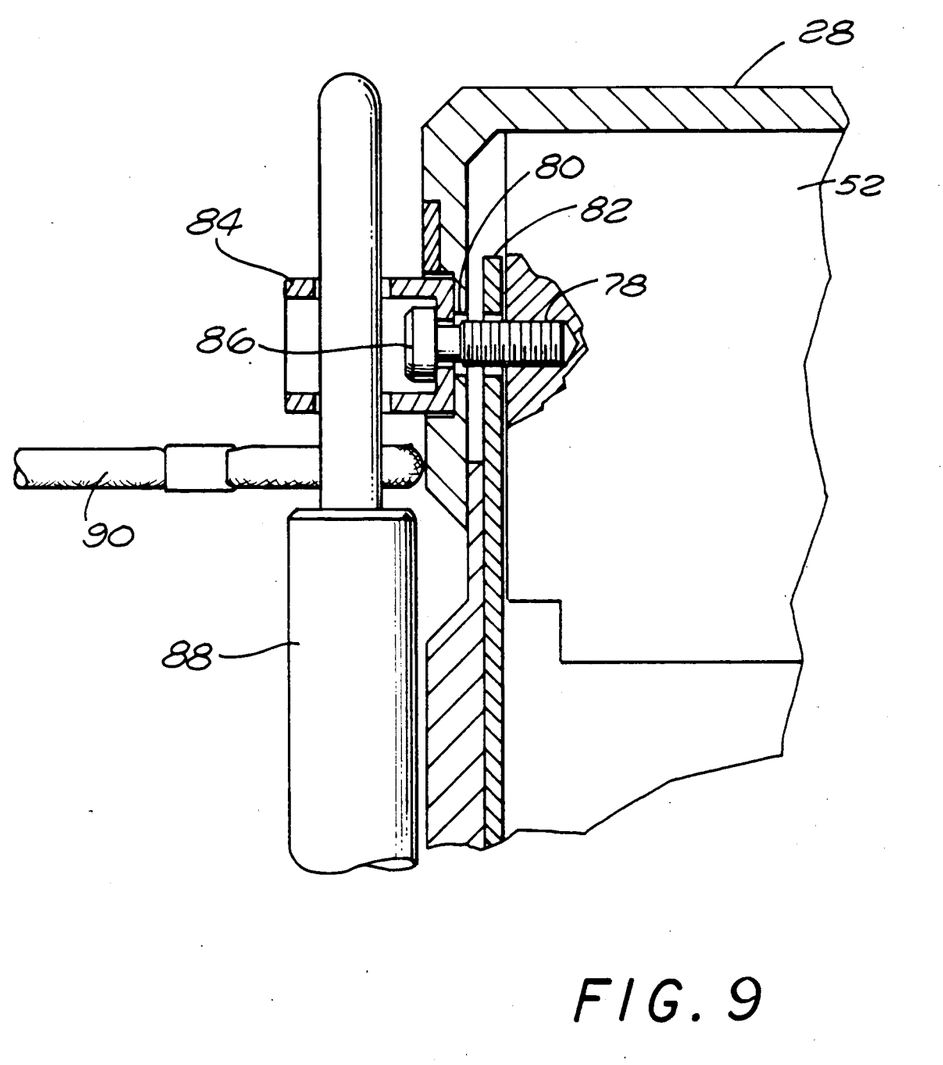
FIG. 9 is a cross section taken through a portion of the rear of the computer along line 9—9 of FIG. 10 illustrating the locking system for locking the housing assemblies together and if desired locking the computer to a restraining cable to limit the allowed physical movement of the computer.
Figure 10:
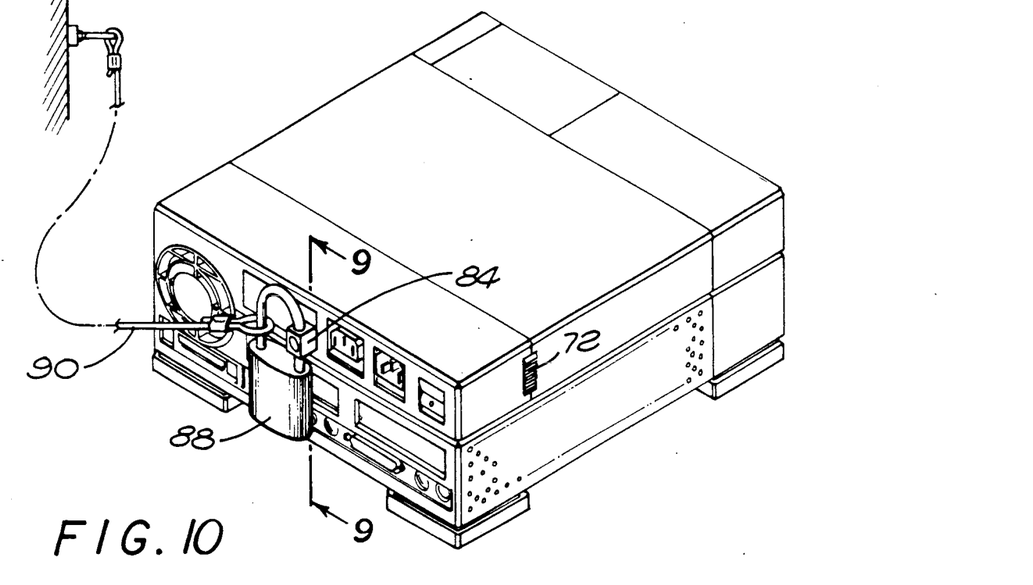
FIG. 10 is a perspective rear view of the complete computer assembly as locked together and to a restraining cable.

As may be seen in FIG. 6, power supply 52 has a threaded hole 78 in the front thereof which aligns with a hole 80 (see FIGS. 2 and 6) when assembled therewith. Also as may be seen in FIG. 3, one of the metal plates 58 has an upward projecting tab 82 thereon having a hole therethrough. The tab 82, also visible in FIG. 1, extends above the open face of the lower housing assembly 26 so that when the upper and lower housing assemblies are assembled together as shown in FIG. 1, the tab will align with the threaded hole 78 in the case of the power supply 52 and of course the corresponding hole 80 in the upper housing member as shown in FIG. 9. This figure as well as FIGS. 10 and 11 illustrate a unique locking arrangement used for the present invention to limit access to the inside of the computer to authorized personnel, and at the same time, if desired, to provide a means for locking the computer in place to deter theft of the relatively small but highly valuable device.

Figure 11:
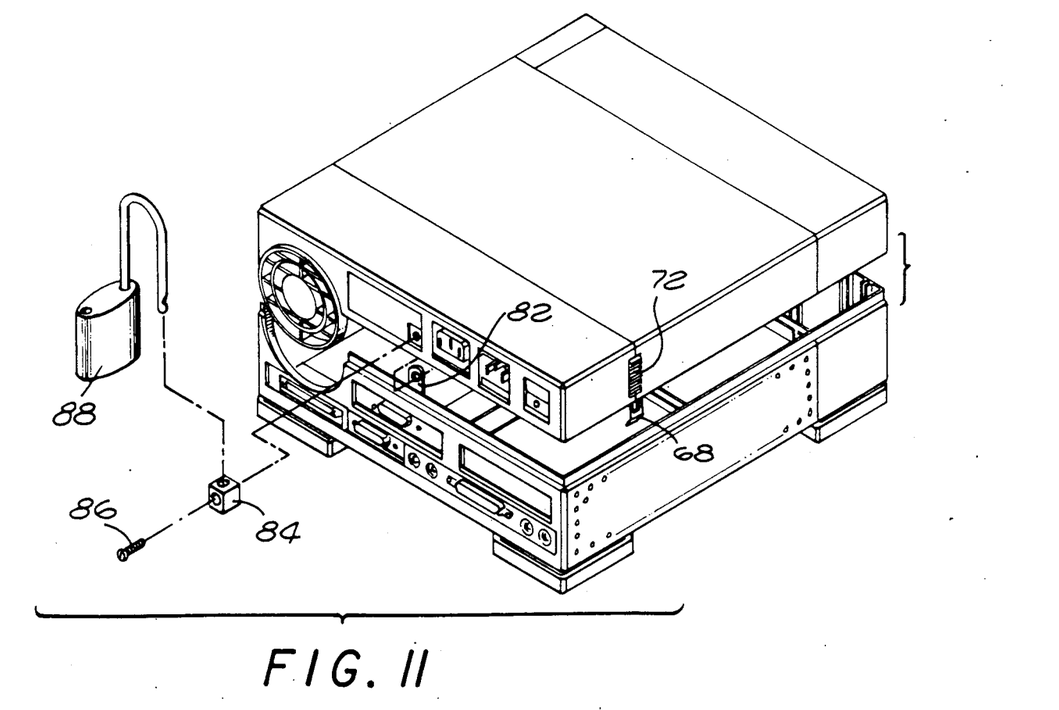
FIG. 11 is an exploded view of the computer assembly and lock system of the present invention.

As shown in FIGS. 9 and 11, a rectangular locking member 84 is provided. This locking member fits within a cooperatively disposed recess in the upper housing assembly 28 preventing rotation thereof, and when in use, is held in position by a screw 86 passing through a horizontal counterbored hole in the member 84, through the hole 80 in the upper housing assembly, through the hole in tab 82 coupled to the lower housing assembly and threaded into the threaded hole 78 in the power supply 52 (see FIG. 9). Locking member 84 also includes a second hole through the counterbored region thereof orthogonal to the horizontal hole therethrough for receiving the clasp of a conventional lock 88, such as a combination lock for a key operated padlock. With the lock 88 locked in place as shown in FIG. 10, access to the head of screw 86 is blocked, so that the same may not be removed to allow the opening of the computer enclosure. The lock 88 may also be used to couple to a cable 90 (see FIG. 9 and 10) for locking the computer in place so that the same may not be quietly and inconspicuously slipped into a large briefcase or other box for easy and unauthorized removal.

There has been disclosed and described herein a new and unique computer housing construction which is simple, adaptable to various computer configurations, rugged and easily opened to provide access to the various components therein for servicing, removal and troubleshooting, while at the same time allowing all electrical connections within and to and from the computer system to be maintained so that the computer system and all components thereof may be exercised in a real operating environment even when the computer is so opened. Also the construction disclosed more readily facilitates upgrading of the computer than prior art constructions. By way of example, upgrades in the disc drives can easily be made or new technology bulk storage devices installed either by changing the frame holding the drives in the top housing assembly, or if necessary, by simply changing the top housing assembly, including the upper housing member, all without any dissassembly of the lower housing assembly required.

While the preferred embodiment of the present invention has been disclosed and described herein, it will be understood by those skilled in the art that various changes in form and detail may be made therein without departing from the spirit and scope of the invention.

We claim:

1. A computer comprising:
   first and second housing assemblies, each having an open face, for cooperatively defining a computer enclosure when said open faces are disposed adjacent each other;
   a CPU board coupled within said first housing assembly so as to be accessible from the open face of said first housing assembly;
   a power supply coupled within said second housing assembly;
   at least one device peripheral to said CPU board supported on a rigid frame also coupled within said second housing assembly adjacent said power supply when viewed through said open face of said second housing assembly;
   coupling means operatively connected to said first and second housing assemblies for releasably coupling said first and second housing assemblies together when said open faces are disposed adjacent each other, said coupling means being constructed to allow said second housing assembly to separate from said first housing assembly when said coupling means are released, separation of said housing assemblies further allowing said housings to be positioned such that said CPU board, said power supply and said at least one device peripheral to said CPU board are exposed;
   flexible electrical connection means electrically intercoupling said CPU board, said power supply and said at least one device peripheral to said CPU board, said flexible electrical connection means being constructed such that said CPU board, power supply and device peripheral to said CPU board can be trouble shooted and serviced when said housing assemblies are separated and said CPU board, power supply and device peripheral to said CPU board are exposed; and, at least one of said housing assemblies providing access for electrical connectors for making external electrical connection to said computer.

2. The computer of claim 1 wherein said power supply extends beyond said open face of said second housing assembly and has a close slip fit into the adjacent region of said first housing assembly when said open faces of said first and second housing assemblies are disposed adjacent each other, said power supply having a rigid power supply enclosure, whereby said power supply serves to align said first and second housing assemblies when said first and second housing assemblies are disposed adjacent each other to cooperatively define the computer enclosure.

3. The computer of claim 2 further comprising latches captured by said power supply and extending beyond said open face of said second housing assembly to releasably latch onto said first housing assembly when said open faces of said first and second housing assemblies are disposed adjacent each other to at least partially retain said housing assemblies in said cooperative disposition defining said computer enclosure, said latches being manually operable from outside said enclosure to release the same from said first housing assembly.

4. The computer of claim 2 wherein said at least one device peripheral to said CPU board is a disk drive.

5. The computer of claim 2 wherein said first and second housing assemblies are both releasably fastened to said power supply by a fastener.

6. The computer of claim 5 further comprising a lock for controlling access to said fastener.

7. The computer of claim 6 further comprising means operatively connected to said lock and a reference structure, to restrain said computer from moving from a predetermined area.

8. The computer of claim 6 wherein said lock comprises a lock member having a first opening therethrough for receiving a manually removeable member joining said first and second housing assemblies, and a second opening for receiving a manually operable lock for blocking access to said manually removeable member to prevent removal thereof.

9. The computer of claim 6 wherein said lock is disposed adjacent one side of said computer enclosure and wherein said first and second housing assemblies hook together adjacent a second side opposite said first side to retain the same when said lock is in place.

10. A computer comprising:
first and second housing assemblies, each having the approximate shape of a shallow box with a horizontal area bounded by vertical side walls circumscribing an open face at the top thereof, for cooperatively defining a computer enclosure when said open faces are disposed adjacent each other;
a CPU board coupled within said first housing assembly so as to be accessible from the open face of said first housing assembly;
a power supply coupled within said second housing assembly;
at least one device peripheral to said CPU board supported on a rigid frame also coupled within said second housing assembly adjacent said power supply when viewed through said open face of said second housing assembly;
coupling means operatively connected to said first and second housing assemblies for releasably coupling said first and second housing assemblies together when said open faces are disposed adjacent each other, said coupling means being constructed to allow said second housing assembly to separate from said first housing assembly when said coupling means are released, separation of said housing assemblies further allowing said housings to be positioned such that said CPU board, said power supply and said at least one device peripheral to said CPU board are exposed;
flexible electrical connection means electrically intercoupling said CPU board, said power supply and said at least one device peripheral to said CPU board, said flexible electrical connection means being constructed such that said CPU board, power supply and device peripheral to said CPU board can be trouble shooted and serviced when said housing assemblies are separated and said CPU board, power supply and device peripheral to said CPU board are exposed; and,
at least one of said housing assemblies providing access for electrical connectors for making external electrical connection to said computer.

11. The computer of claim 10 wherein said power supply extends beyond said open face of said second housing assembly and has a close slip fit into the adjacent region of said first housing assembly when said open faces of said first and second housing assemblies are disposed adjacent each other, said power supply having a rigid power supply enclosure, whereby said power supply serves to align said first and second housing assemblies when said first and second housing assemblies are disposed adjacent each other to cooperatively define the computer enclosure.

12. The computer of claim 11 further comprising latches captured by said power supply and extending beyond said open face of said second housing assembly to releasably latch onto said first housing assembly when said open faces of said first and second housing assemblies are disposed adjacent each other to at least partially retain said housing assemblies in said cooperative disposition defining said computer enclosure, said latches being manually operable from outside said enclosure to release the same from said first housing assembly.

13. The computer of claim 11 wherein said at least one device peripheral to said CPU board is a disk drive.

14. The computer of claim 11 wherein said first and second housing assemblies are both releasably fastened to said power supply by a fastener.

15. The computer of claim 14 further comprising a lock for controlling access to said fastener.

16. The computer of claim 15 further comprising means operatively connected to said lock and a reference structure, to restrain said computer from moving from a predetermined area.

17. The computer of claim 15 wherein said lock comprises a lock member having a first opening therethrough for receiving a manually removeable member joining said first and second housing assemblies, and a second opening for receiving a manually operable lock for blocking access to said manually removeable member to prevent removal thereof.

18. The computer of claim 15 wherein said lock is disposed adjacent one side of said computer enclosure and wherein said first and second housing assemblies hook together adjacent a second side opposite said first side to retain the same when said lock is in place.

19. A computer comprising:
first and second housing members, each having the approximate shape of a shallow box with an open face at the top thereof, for cooperatively defining a computer enclosure when said open faces are disposed adjacent each other;
at least one computer device mechanically retained within each of said housing members, said first and second housing members having computer devices coupled within said first housing member and computer devices coupled within said second housing member;
coupling means operatively connected to said first and second housing members for releasably coupling said first and second housing members together when said open faces are disposed adjacent each other, said coupling means being constructed to allow said second housing member to separate from said first housing member when said coupling means are released, separation of said housing members further allowing said housings to be positioned such that said computer devices are exposed;
flexible electrical connection means electrically intercoupling said computer devices coupled within said first housing member and said computer devices coupled within said second housing member, said flexible electrical connection means being constructed such that said devices in said first and second housing members can be trouble shooted and serviced when said housing members are separated and said devices are exposed; and,
at least one of said housing members providing access for electrical connectors for making external electrical connection to said computer.

20. The computer of claim 19 wherein said coupling means comprises means for hooking said first and second housing members together adjacent a first side thereof, and means for locking said first and second members together along a second side thereof opposite said first side.

21. The computer of claim 20 wherein said lock comprises a lock member having a first opening therethrough for receiving a manually removeable member joining said first and second housing assemblies, and a second opening for receiving a manually operable lock for blocking access to said manually removeable member to prevent removal thereof.

22. The computer of claim 21 wherein said first and second openings in said lock member are substantially orthogonal openings.

23. The computer of claim 22 further comprised of a clasp lock having the clasp thereof passing through said second opening in said lock member.

24. The computer of claim 23 further comprised of a restraining means, said clasp of said clasp lock having the clasp thereof also passing through said restraining means for limiting the physical movement of said computer.

* * * * *